(12) United States Patent
Liu

(10) Patent No.: US 12,257,960 B1
(45) Date of Patent: Mar. 25, 2025

(54) LICENSE PLATE CARRIER CONVENIENT TO BE INSTALLED ON AUTOMOBILE

(71) Applicant: Wenxiang Zhan, Guangdong (CN)

(72) Inventor: Zengrui Liu, Guangdong (CN)

(*) Notice: Subject to any disclaimer, the term of this patent is extended or adjusted under 35 U.S.C. 154(b) by 0 days.

(21) Appl. No.: 18/798,075

(22) Filed: Aug. 8, 2024

(51) Int. Cl.
*B60R 13/10* (2006.01)

(52) U.S. Cl.
CPC .................. *B60R 13/105* (2013.01)

(58) Field of Classification Search
CPC ............. B60R 13/105; B60R 11/0235; G09F 2007/1843; G09F 2007/1865; G09F 2007/1895; G09F 7/18
See application file for complete search history.

(56) References Cited

U.S. PATENT DOCUMENTS

| | | | |
|---|---|---|---|
| 9,725,052 B1 * | 8/2017 | Honaker | F16B 2/12 |
| 10,518,721 B1 * | 12/2019 | Nowakowski | G09F 7/18 |
| 11,472,351 B2 * | 10/2022 | Pham | B60R 13/105 |
| 11,780,385 B1 * | 10/2023 | Qu | G09F 7/18 |
| | | | 40/209 |
| 11,872,947 B1 * | 1/2024 | Qu | B60R 11/0235 |
| 12,060,017 B1 * | 8/2024 | Zhang | B60R 13/105 |

* cited by examiner

*Primary Examiner* — Corey N Skurdal
(74) *Attorney, Agent, or Firm* — Hawaii Patent Services; Nathaniel K. Fedde; Kenton N. Fedde

(57) ABSTRACT

The present invention provides a license plate carrier convenient to be installed on an automobile, comprising a frame for connecting a license plate and a bracket connected with the frame, wherein the bracket is provided with a cantilever end connected with the frame and an attachment end for engaging a vehicle grille; the attachment end is provided with a fixed arm and a movable arm extending outwards, and the movable arm can swing on the bracket in a limited range to open an included angle with the fixed arm, and both the fixed arm and the movable arm are provided with intercepting parts for hooking the vehicle grille; wherein, the bracket is provided with a locking mechanism for keeping the opened included angle between the movable arm and the fixed arm.

16 Claims, 5 Drawing Sheets

LICENSE PLATE CARRIER CONVENIENT TO BE INSTALLED ON AUTOMOBILE

TECHNICAL FIELD

The present invention relates to the technical field of automobile parts, in particular to a license plate carrier which is convenient to be installed on an automobile.

BACKGROUND

The traditional car design usually has a fixed license plate position on the front bumper. Some cars cancel the fixed license plate position in order to reduce the air resistance and optimize the front flow linearity, so a license plate fixing frame which can be detachably installed on the front grille of the vehicle is born, which is convenient for the installation of the license plate without damaging the grille and bumper of the vehicle.

License plate fixing bracket is a shelf for placing license plates, which mainly plays the role of fixing license plates and protecting license plates and car bodies. In order to reduce the air resistance during driving, the front face design of new energy pure electric vehicles usually emphasizes the simplicity of streamline, and at the same time, some areas (such as some States in the United States) do not require vehicles to hang the front license plate, prompting some models to cancel the position of the front bumper to fix the license plate. If consumers want to install the front license plate, they need to use glue, double-sided tape and other fixing methods, or even drill holes in the bumper to fix it. These fixing methods are difficult to operate and may cause damage to the front bumper.

In the prior art, such as the "License plate bracket" also proposed in the U.S. patent application with a publication number of US20140060598A1 and the "Grill mounted front license plate bracket" proposed in U.S. Pat. No. 6,757,998, which provides a front license plate bracket mounted on a grille, which is used for mounting a license plate to the front of a vehicle without the front license plate bracket, and a device for mounting a license plate to a vehicle can pass through a vehicle body without drilling mounting holes.

However, in the solution disclosed above, the license plate is fixed on the bracket after fixing the grille on the vehicle head, and the connection between the fixing bracket and the grille is easy to cause the vehicle grille to break, which leads to the low reliability of the license plate fixing bracket.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The present invention provides a license plate carrier which is convenient to be installed on an automobile, which includes a frame for connecting a license plate and a bracket connected with the frame, wherein the bracket has a cantilever end connected with the frame and an attachment end for engaging a vehicle grille; the attachment end is provided with a fixed arm and a movable arm which extend outward and can extend into the vehicle grille; the movable arm can swing in a limited range on the bracket to open an included angle with the fixed arm, and both the fixed arm and the movable arm are provided with intercepting parts for hooking the vehicle grille;

wherein, the bracket is provided with a locking mechanism for keeping the opened included angle between the movable arm and the fixed arm, and the locking mechanism has at least one locking position.

The present invention further provides a license plate carrier which is convenient to be installed on an automobile, which includes a frame for connecting a license plate and a bracket connected with the frame, wherein the bracket includes at least two side plates, each side plate has a cantilever end connected with the frame and an attachment end for engaging a vehicle grille, and the attachment end is provided with a fixed arm and a movable arm which extend outward and can extend into the vehicle grille; the movable arm can swing on the bracket in a limited range to open an included angle with the fixed arm, and both the fixed arm and the movable arm are provided with intercepting parts for hooking the vehicle grille; and wherein, the bracket is provided with a locking mechanism for keeping the opened included angle between the movable arm and the fixed arm, and the locking mechanism has at least one locking position.

The present invention further provides a license plate carrier which is convenient to be installed on an automobile, which includes a frame for connecting a license plate and a bracket connected with the frame, wherein the bracket has a cantilever end connected with the frame and an attachment end for engaging a vehicle grille, and the attachment end is provided with a fixed arm and a movable arm which extend outward and can extend into the vehicle grille; the movable arm can swing in a limited range on the bracket to open an included angle with the fixed arm, and both the fixed arm and the movable arm are provided with intercepting parts for hooking the vehicle grille; and wherein, the bracket is provided with a driving mechanism for driving the movable arm to rotate and open the included angle with the fixed arm, and a locking mechanism for maintaining the opened included angle between the movable arm and the fixed arm; and the locking mechanism has at least one locking position.

BRIEF DESCRIPTION OF DRAWINGS

In order to explain the technical solution of this application more clearly, the drawings needed in the implementation will be briefly introduced below. Obviously, the drawings described below are only some implementations of this application. For those skilled in the art, other drawings can be obtained according to these drawings without creative work.

REFERENCE SIGNS

Figure 1:
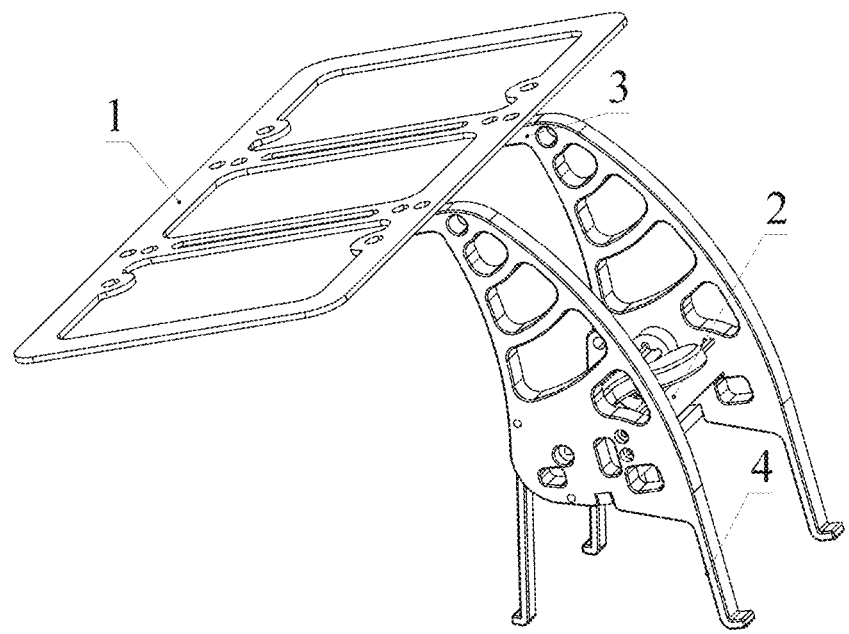
FIG. 1 is a schematic diagram of the overall structure of a preferred embodiment of the present invention.
Figure 2:
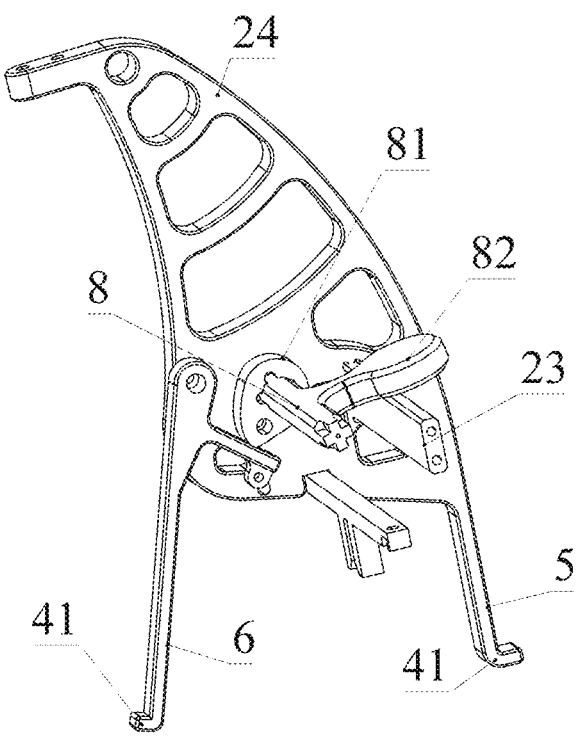
FIG. 2 is a partial structural diagram of a preferred embodiment of the present invention.
Figure 3:
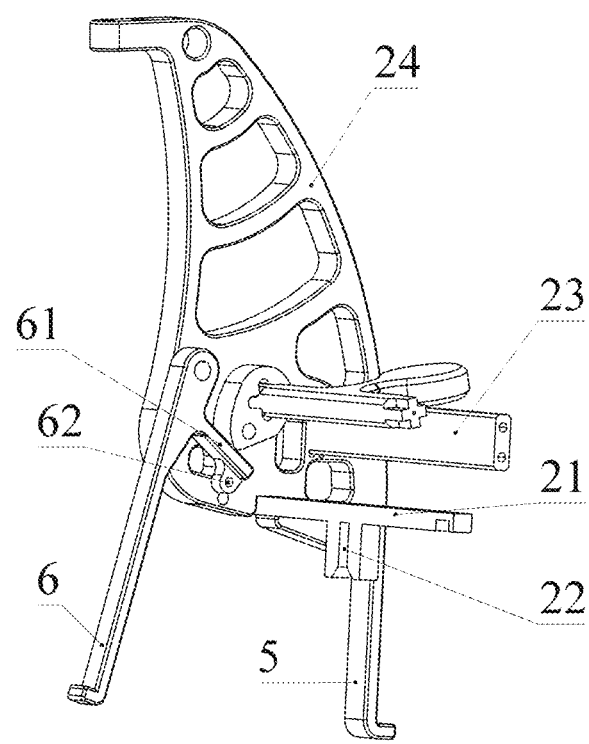
FIG. 3 is another schematic diagram of the partial structure of the preferred embodiment of the present invention.
Figure 4:
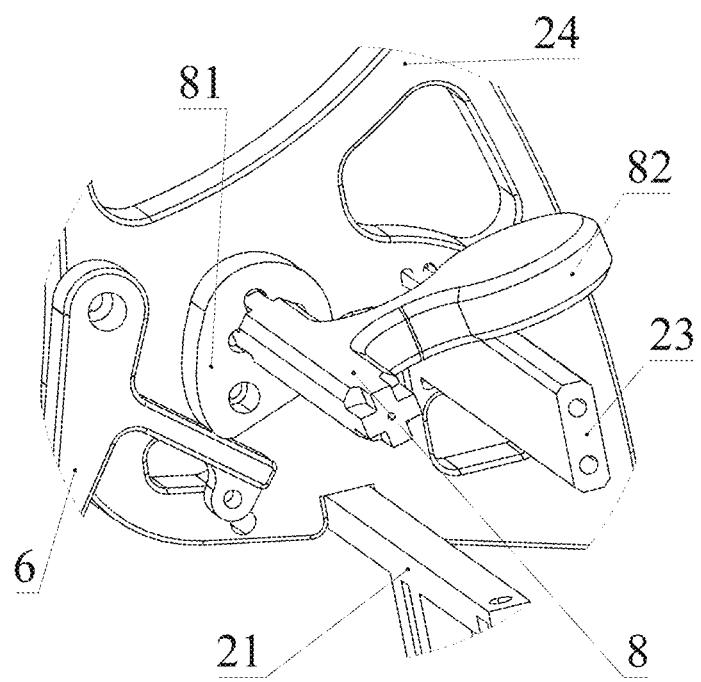
FIG. 4 is a partial enlarged view of FIG. 3 according to the preferred embodiment of the present invention.
Figure 5:
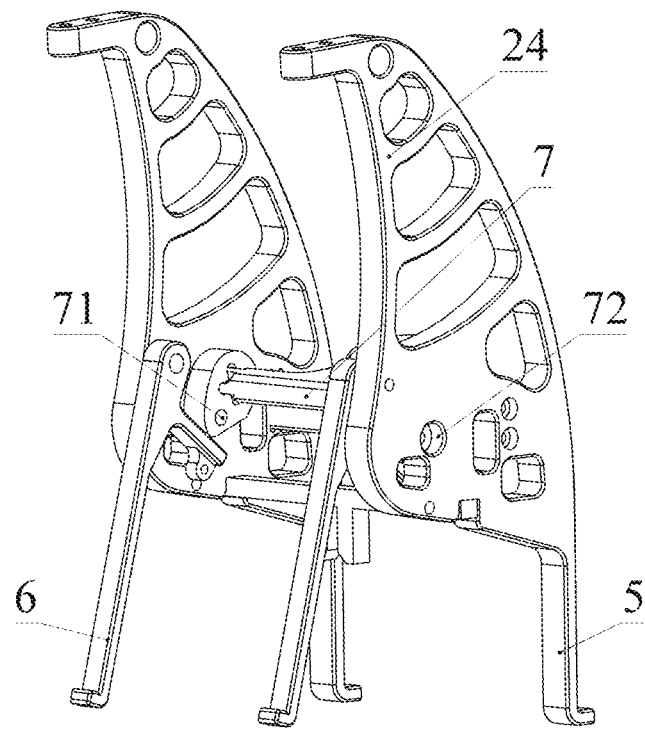
FIG. 5 is another schematic diagram of the overall structure of the preferred embodiment of the present invention.
Figure 6:
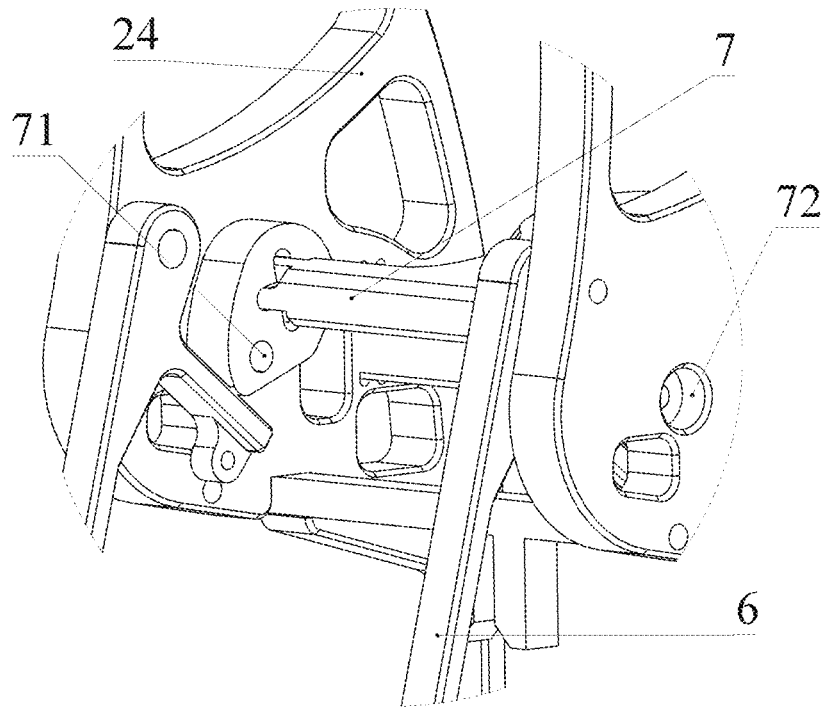
FIG. 6 is a partial enlarged view of FIG. 5 according to the preferred embodiment of the present invention.

Frame (1); Bracket (2); Cantilever end (3); Attachment end (4); Fixed arm (5); Movable arm (6); Locking mechanism (7); Toggle lever (8); Clamping member (21); Clamping groove (22); Limit lever (23); Side plate (24); Intercepting part (41); Follow-up arm (61); Spring seat (62); Locking hole (71); Positioning hole (72); Toggle block (81); Operating block (82); Protruding end (83).

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

As shown in FIG. 1 to FIG. 9, the present invention provides a license plate carrier 2 which is convenient to be installed on an automobile, and includes a frame 1 for connecting license plates and a bracket 2 connected with the frame 1. The bracket 2 has a cantilever end 3 connected with the frame 1 and an attachment end 4 for engaging a vehicle grille. The attachment end 4 is provided with a fixed arm 5 and a movable arm 6 which extend outward, and the movable arm 6 can swing on the bracket 2 in a limited range to open the included angle with the fixed arm 5. Both the fixed arm 5 and the movable arm 6 are provided with angles for hooking the vehicle grille.

Wherein, the bracket 2 is provided with a locking mechanism 7 for keeping the opened included angle between the movable arm 6 and the fixed arm 5.

The frame 1 is used to connect license plates. The fixed arm 5 and the movable arm 6 can extend into the grille of the vehicle, the fixed arm 5 can hook the bottom frame of the grille, and the movable arm 6 rotates relative to the bracket 2 to hook the top frame of the grille, so that the license plate fixing frame is fixed to the grille.

During installation, the fixed arm 5 and the movable arm 6 respectively extend into the gap between the upper and lower parts of the grille, so that the intercepting part 41 of the fixed arm 5 abuts against the inner surface of the lower frame of the grille, so that the fixed arm 5 is hooked on the lower frame of the grille. Then the movable arm 6 is rotated to make the intercepting part 41 of the movable arm 6 abut against the inner surface of the upper frame of the grille, so that the movable arm 6 hooks the upper frame of the grille, and the movable arm 6 is locked, so that the license plate fixing frame of this embodiment is connected with the grille of the vehicle, and finally install the license plate on the frame 1 by screws, thus completing the installation of the license plate.

In some embodiments (not shown), the intercepting part 41 can be replaced by other forms of fixing devices, such as clips or magnetic devices, especially for vehicle grilles with different materials or shapes. In addition to retaining its rotating and fixing functions, the movable arm 6 can be designed as a retractable or angle-adjustable hook to adapt to grille top frames with different heights or inclined angles. Elastic elements (such as spring leaf or rubber pad) can also be used for the intercepting part 41 to increase the abutting force, and improve the installation stability and shock absorption effect.

The shapes and materials of the intercepting parts 41 of the fixed arm 5 and the movable arm 6 can be replaced according to the actual situation. For example, a hook-shaped design with stronger bite force can be used, or a hook made of more wear-resistant materials (such as stainless steel) can be used to further enhance its fixing effect and durability.

The bracket 2 includes two opposite side plates 24, which extend away from the frame 1 to form the attachment end 4 respectively. Two side plates 24 extend in the direction close to the frame 1 to form the cantilever ends 3 respectively, and the frame 1 is connected with the two side plates 24 respectively. Specifically, the side plate 24 can be made of metal or hard nonmetallic materials, and in order to reduce the weight of the side plate 24, the side plate 24 is arranged in a hollow frame 1 structure. In addition to metal or hard nonmetallic materials, other light and high-strength materials, such as aluminum alloy and carbon fiber, can also be considered to further reduce weight while maintaining structural strength. In order to reduce the weight, in addition to the frame 1 structure, other forms of lightweight design can also be used, such as honeycomb structure, foam filling structure, etc., which can reduce the use of materials while ensuring strength.

In some embodiments (not shown), when the fixed arm 5 and the movable arm 6 have a certain width, the bracket 2 can be realized in the form of a single side plate 24, or two groups of fixed arm 5 and movable arm 6 can be arranged on a single side plate 24 with a sufficient width, so that the fixed arm 5 and movable arm 6 can extend into the grille of the vehicle, the fixed arm 5 can hook the bottom frame of the grille, and the movable arm 6 rotates relative to the bracket 2 to hook the top frame of the grille, which will be convenient to be installed on the automobile.

The connection mode between the frame 1 and the cantilever end 3 can be replaced by a more firm or easy-to-install design, such as using bolts, buckles or quick-release locks.

The bracket 2 is provided with a clamping member 21, and the clamping member 21 is provided with a clamping groove 22 for clamping the center line of the vehicle grille, and the clamping groove 22 extends in the vertical direction to limit the horizontal shift of the bracket 2.

Figure 7:
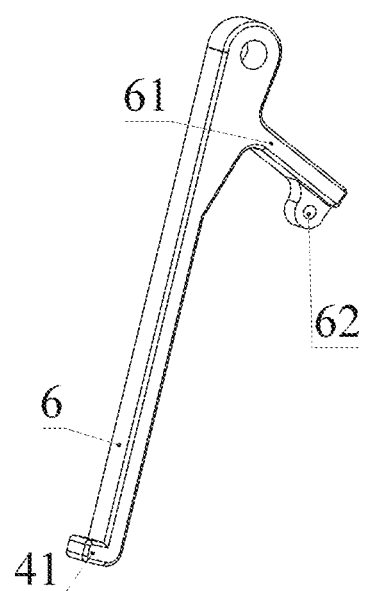
FIG. 7 is a schematic structural diagram of a movable arm according to a preferred embodiment of the present invention.
Figure 8:
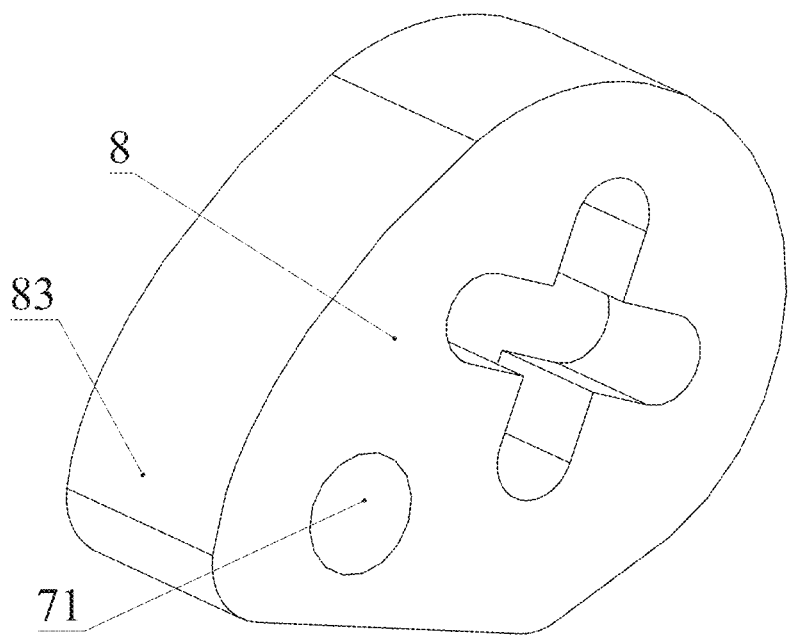
FIG. 8 is a schematic structural diagram of a toggle block according to a preferred embodiment of the present invention.
Figure 9:
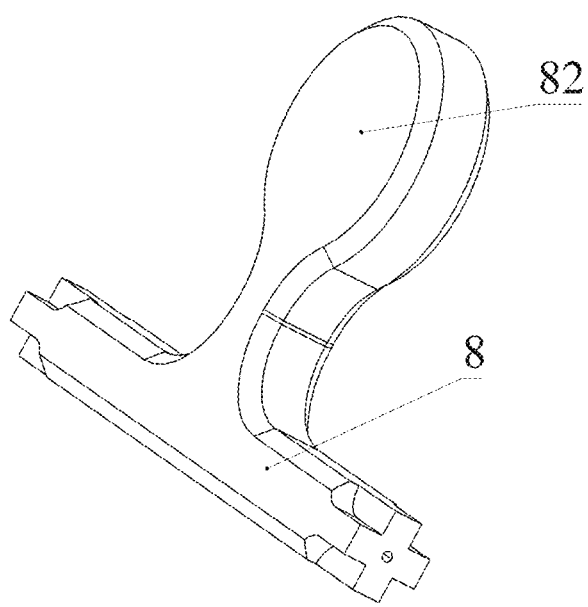
FIG. 9 is a schematic structural diagram of a toggle lever according to a preferred embodiment of the present invention.

As shown in FIG. 7 to FIG. 9, the movable arm 6 is provided with a follow-up arm 61, and the bracket 2 is rotatably connected with a toggle lever 8, which is connected with a toggle block 81. During the rotation of the movable arm 6, the toggle block 81 is linked to shift the follow-up arm 61 to drive the movable arm 6 to rotate. The toggle block 81 is provided with a cruciform spline groove, and the toggle lever 8 is provided with a spline adapted to the spline groove, and the spline is inserted into the spline groove to be installed, and the toggle lever 8 rotates to drive the toggle block 81 synchronously.

In this embodiment, the toggle block 81 is realized in the shape of a cam. In some embodiments (not shown), the shape of the toggle block 81 can be adjusted according to actual needs to optimize its contact area and friction force with the surface of the follow-up arm 61, thereby improving the stability and efficiency of rotation. In addition, the material of the toggle block 81 can also be replaced with a more wear-resistant and durable material, such as cemented carbide or high-strength plastic. In addition to directly driving the movable arm 6 through the rotation of the toggle block 81, gear, chain, belt and other transmission mechanisms can be considered to replace the cam to achieve smoother and more accurate rotation control. These transmission mechanisms can control the rotation speed and torque more effectively, thus further improving the rotation stability of the movable arm 6.

The toggle lever 8 is provide with an operating block 82, that bracket 2 is provided with a limit lever 23, and the limit lever 23 is arrange on the rotation path of the operating block 82; When the operating block 82 abuts against the limit lever 23, the limit lever 23 prevents the operating block 82 from rotating and limits the maximum opened included angle between the movable arm 6 and the fixed arm 5 driven by the toggle lever 8.

In some embodiments (not shown), the limit lever 23 can be replaced by an elastic element, such as a spring-loaded limit block or a rubber pad. This design can provide gentle resistance when the toggle lever 8 approaches or reaches its travel limit, rather than a hard stop. This helps to reduce the impact and noise, and may extend the service life of the equipment.

The toggle block 81 has a protruding end 83 abutting against the follow-up arm 61, and the bracket 2 is provided with a limit post, which is arranged on the path where the protruding end 83 rotates away from the follow-up arm 61;

When the protruding end 83 abuts against the limiting post, the limiting post prevents the toggle block 81 from rotating, and the protruding end 83 keeps abutting against the follow-up arm 61. The limit post and the limit lever 23 work together to limit the moving range of the toggle lever 8, that is, the toggle lever 8 is limited to rotate between the limit post and the limit lever 23 to prevent the operating block 82 from rotating to an angle inconvenient for users.

The movable arm 6 is provided with a spring seat 62 and an elastic member. One end of the elastic member is connected to the spring seat 62 and the other end is connected to the bracket 2 to drive the movable arm 6 to rotate and close the included angle with the fixed arm 5, that is, the elastic member is used to drive the movable arm 6 to rotate and reset, so as to separate the movable arm 6 from the grille. The elastic member is a double-hook spring, and both ends of the double-hook spring are respectively mounted to the spring seat 62 and the bracket 2 through bolts.

The locking mechanism 7 includes a locking hole 71 arranged on the toggle block 81, a positioning hole 72 arranged on the bracket 2 and a latch, wherein the positioning hole 72 is arranged corresponding to the moving track of the locking hole 71 along with the rotation of the toggle lever 8, and the latch passes through the locking hole 71 and the positioning hole 72 to limit the rotation of the toggle block 81 to maintain the opened included angle between the movable arm 6 and the fixed arm 5. There are a plurality of positioning holes 72 corresponding to the moving track of the locking hole 71 along with the rotation of the toggle lever 8.

In some embodiments (not shown), in order to simplify the installation and adjustment process, an elastic locking mechanism can be introduced. This mechanism can automatically lock when the cam moves to the required position and release it by simple operation when necessary. For example, a spring-loaded locking pin or cam locking device can be used.

In some embodiments (not shown), the contact area between the fixed arm 5 and the bracket 2 or the grille can be increased by design, which can effectively disperse the load and improve the connection strength. For example, the bottom width of the intercepting part 41 can be increased or a special contact surface shape can be designed. At the same time, the structure of the hook can be optimized, such as adding stiffeners and changing the section shape, so as to improve its overall stiffness and bearing capacity.

The present invention further provides a license plate carrier 2 which is convenient to be installed on an automobile, and includes a frame 1 for connecting a license plate and a bracket 2 connected with the frame 1, wherein the bracket 2 includes at least two side plates 24, each side plate 24 has a cantilever end 3 connected with the frame 1 and an attachment end 4 for engaging a vehicle grille; the attachment end 4 is provided with a fixed arm 5 and a movable arm 6 extending outward, and the movable arm 6 can swing on the bracket 2 in a limited range to open an included angle with the fixed arm 5, and both the fixed arm 5 and the movable arm 6 are provided with.

Wherein, the bracket 2 is provided with a locking mechanism 7 for keeping the opened included angle between the movable arm 6 and the fixed arm 5.

The frame 1 is used to connect license plates. The fixed arm 5 and the movable arm 6 can extend into the grille of the vehicle, the fixed arm 5 can hook the bottom frame of the grille, and the movable arm 6 rotates relative to the bracket 2 to hook the top frame of the grille, so that the license plate fixing frame is fixed to the grille.

During installation, the fixed arm 5 and the movable arm 6 respectively extend into the gap between the upper and lower parts of the grille, so that the intercepting part 41 of the fixed arm 5 abuts against the inner surface of the lower frame of the grille, so that the fixed arm 5 is hooked on the lower frame of the grille. Then the movable arm 6 is rotated to make the intercepting part 41 of the movable arm 6 abut against the inner surface of the upper frame of the grille, so that the movable arm 6 hooks the upper frame of the grille, and the movable arm 6 is locked, so that the license plate fixing frame of this embodiment is connected with the grille of the vehicle, and finally the license plate is installed on the frame 1 by screws, thus completing the installation of the license plate.

In some embodiments (not shown), the intercepting part 41 can be replaced by other forms of fixing devices, such as clips or magnetic devices, especially for vehicle grilles with different materials or shapes. In addition to retaining its rotating and fixing functions, the movable arm 6 can be designed as a retractable or angle-adjustable hook to adapt to grille top frames with different heights or inclined angles. Elastic elements (such as spring leaf or rubber pad) can also be used for the intercepting part 41 to increase the abutting force, and improve the installation stability and shock absorption effect.

The shapes and materials of the intercepting parts 41 of the fixed arm 5 and the movable arm 6 can be replaced according to the actual situation. For example, a hook-shaped design with stronger bite force can be used, or a hook made of more wear-resistant materials (such as stainless steel) can be used to further enhance its fixing effect and durability.

A clamping member 21 is connected between the side plates 24, and the clamping member 21 is provided with a clamping groove 22 for being clamped in the center line of the vehicle grille, and the clamping groove 22 extends in the vertical direction to limit the horizontal shift of the bracket 2.

The movable arm 6 is provided with a follow-up arm 61, and the side plates 24 are connected with a toggle lever 8, which is respectively connected with the side plates 24 on both sides in a rotating manner. The toggle lever 8 is connected with a toggle block 81. During the rotation of the movable arm 6, the toggle block 81 is linked to toggle the follow-up arm 61 to drive the movable arm 6 to rotate. The toggle block 81 is provided with a cruciform spline groove, and the toggle lever 8 is provided with a spline adapted to the spline groove. The spline is inserted into the spline groove to be installed; when the toggle lever 8 rotates, it drives the toggle block 81 to rotate synchronously.

In this embodiment, the toggle block 81 is realized in the shape of a cam. In some embodiments (not shown), the shape of the toggle block 81 can be adjusted according to actual needs to optimize its contact area and friction force with the surface of the follow-up arm 61, thereby improving the stability and efficiency of rotation. In addition, the material of the toggle block 81 can also be replaced with a more wear-resistant and durable material, such as cemented carbide or high-strength plastic. In addition to directly driving the movable arm 6 through the rotation of the toggle block 81, gear, chain, belt and other transmission mechanisms can be considered to replace the cam to achieve smoother and more accurate rotation control. These transmission mechanisms can control the rotation speed and torque more effectively, thus further improving the rotation stability of the movable arm 6.

The toggle lever 8 is provide with an operating block 82, that bracket 2 is provided with a limit lever 23, and the limit lever 23 is arrange on the rotation path of the operating block 82; When the operating block 82 abuts against the limit lever 23, the limit lever 23 prevents the operating block 82 from rotating and limits the maximum opened included angle between the movable arm 6 and the fixed arm 5 driven by the toggle lever 8.

The toggle block 81 has a protruding end 83 abutting against the follow-up arm 61, and the bracket 2 is provided with a limit post, which is arranged on the path where the protruding end 83 rotates away from the follow-up arm 61;

wherein, when the protruding end 83 abuts against the limiting post, the limiting post prevents the toggle block 81 from rotating, and the protruding end 83 keeps abutting against the follow-up arm 61. The limit post and the limit lever 23 work together to limit the moving range of the toggle lever 8, that is, the toggle lever 8 is limited to rotate between the limit post and the limit lever 23 to prevent the operating block 82 from rotating to an angle inconvenient for users.

The movable arm 6 is provided with a spring seat 62 and an elastic member. One end of the elastic member is connected to the spring seat 62 and the other end is connected to the bracket 2 to drive the movable arm 6 to rotate and close the included angle with the fixed arm 5. The elastic member is a double-hook spring, and both ends of the double-hook spring are respectively mounted to the spring seat 62 and the side plate 24 by bolts.

The locking mechanism 7 includes a locking hole 71 on the toggle block 81, a positioning hole 72 on the side plate 24, and a latch. The positioning hole 72 corresponds to the moving track of the locking hole 71 along with the rotation of the toggle lever 8, and the latch passes through the locking hole 71 and the positioning hole 72 to limit the rotation of the toggle block 81 to maintain the opened included angle between the movable arm 6 and the fixed arm 5. There are a plurality of positioning holes 72 corresponding to the moving track of the locking hole 71 along with the rotation of the toggle lever 8.

The present invention further provides a license plate carrier 2 which is convenient to be installed on an automobile, and includes a frame 1 for connecting a license plate and a bracket 2 connected with the frame 1, wherein the bracket 2 has a cantilever end 3 connected with the frame 1 and an attachment end 4 for engaging a vehicle grille, and the attachment end 4 is provided with a fixed arm 5 and a movable arm 6 extending outward, and the movable arm 6 can swing on the bracket 2 in a limited range to open an included angle with the fixed arm 5, and both the fixed arm 5 and the movable arm 6 are provided with intercepting parts 41 for hooking the vehicle grille;

wherein, the bracket 2 is provided with a driving mechanism for driving the movable arm 6 to rotate and open the included angle with the fixed arm 5, and a locking mechanism 7 for keeping the opened included angle between the movable arm 6 and the fixed arm 5.

The bracket 2 includes at least two opposite side plates 24, and a clamping member 21 is connected between the side plates 24. The clamping member 21 is provided with a clamping groove 22 for being clamped in the center line of the vehicle grille, and the clamping groove 22 extends in the vertical direction to limit the horizontal shift of the bracket 2.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A license plate carrier convenient to be installed on an automobile, comprising a frame for connecting a license plate and a bracket connected with the frame, wherein the bracket has a cantilever end connected with the frame and an attachment end for engaging a vehicle grille; the attachment end is provided with a fixed arm and a movable arm which extend outward and can extend into the vehicle grille; the movable arm can swing in a limited range on the bracket to open an included angle with the fixed arm, and both the fixed arm and the movable arm are provided with intercepting parts for hooking the vehicle grille;
    wherein, the bracket is provided with a locking mechanism for keeping the opened included angle between the movable arm and the fixed arm, and the locking mechanism has at least one locking position; and
    wherein the movable arm is provided with a follow-up arm, the bracket is rotatably connected with a toggle lever, and the toggle lever is connected with a toggle block; and during the rotation of the movable arm, the toggle block moves the follow-up arm in linkage to drive the movable arm to rotate.

2. The license plate carrier convenient to be installed on an automobile according to claim 1, wherein the bracket is provided with a clamping member, and the clamping member is provided with a clamping groove for being clamped in a center line of the vehicle grille, and the clamping groove extends in a vertical direction to limit a horizontal shift of the bracket.

3. The license plate carrier convenient to be installed on an automobile according to claim 1, wherein an operating block is arranged on the toggle lever, a limit lever is arranged on the bracket, and the limit lever is arranged on a rotation path of the operating block; and
    when the operating block abuts against the limit lever, the limit lever prevents the operating block from rotating and limits a maximum opened included angle between the movable arm and the fixed arm formed by driving by the toggle lever.

4. The license plate carrier convenient to be installed on an automobile according to claim 3, wherein, the toggle block has a protruding end abutting against the follow-up arm, and the bracket is provided with a limit post, which is arranged on a path where the protruding end rotates away from the follow-up arm; and
    wherein, when the protruding end abuts against the limit post, the limit post prevents the toggle block from rotating, and the protruding end keeps abutting against the follow-up arm.

5. The license plate carrier convenient to be installed on an automobile according to claim 3, wherein the movable arm is provided with a spring seat and an elastic member, and one end of the elastic member is connected to the spring seat and the other end is connected to the bracket to drive the movable arm to rotate and close the included angle with the fixed arm.

6. The license plate carrier convenient to be installed on an automobile according to claim 5, wherein the elastic member is a double-hook spring, and both ends of the double-hook spring are respectively installed on the spring seat and the bracket through bolts.

7. The license plate carrier convenient to be installed on an automobile according to claim 1, wherein the locking mechanism comprises a locking hole arranged on the toggle block, a positioning hole arranged on the bracket, and a latch, wherein the positioning hole is arranged corresponding to a moving track of the locking hole along with the rotation of the toggle lever, and the latch passes through the locking hole and the positioning hole to limit the rotation of the toggle block to maintain the opened included angle between the movable arm and the fixed arm.

8. The license plate carrier convenient to be installed on an automobile according to claim 7, wherein a plurality of positioning holes are arranged corresponding to the moving track of the locking hole along with the rotation of the toggle lever.

9. The license plate carrier convenient to be installed on an automobile according to claim 1, wherein the bracket comprises two side plates which are oppositely arranged, and the two side plates extend away from the frame to form the attachment end respectively.

10. A license plate carrier convenient to be installed on an automobile, comprising a frame for connecting a license plate and a bracket connected with the frame, wherein the bracket comprises at least two side plates, each of the at least two side plates has a cantilever end connected with the frame and an attachment end for engaging a vehicle grille, and the attachment end is provided with a fixed arm and a movable arm which extend outward and can extend into the vehicle grille; the movable arm can swing on the bracket in a limited range to open an included angle with the fixed arm, and both the fixed arm and the movable arm are provided with intercepting parts for hooking the vehicle grille;

wherein, the bracket is provided with a locking mechanism for keeping the opened included angle between the movable arm and the fixed arm, and the locking mechanism has at least one locking position; and wherein the movable arm is provided with a follow-up arm, and a toggle lever is connected between the at least two side plates, and the toggle lever is rotatably connected with the at least two side plates at both sides; a toggle block is connected to the toggle lever, and during the rotation of the movable arm, the toggle block moves the follow-up arm in linkage to drive the movable arm to rotate.

11. The license plate carrier convenient to be installed on an automobile according to claim 10, wherein a clamping member is connected between the at least two side plates, and a clamping groove for being clamped in a center line of the vehicle grille is arranged on the clamping member, and the clamping groove extends in a vertical direction to limit a horizontal shift of the bracket.

12. The license plate carrier convenient to be installed on an automobile according to claim 10, wherein an operating block is arranged on the toggle lever, a limit lever is arranged on the bracket, and the limit lever is arranged on a rotation path of the operating block; and when the operating block abuts against the limit lever, the limit lever prevents the operating block from rotating and limits a maximum opened included angle between the movable arm and the fixed arm formed by driving by the toggle lever.

13. The license plate carrier convenient to be installed on an automobile according to claim 12, wherein, the toggle block has a protruding end abutting against the follow-up arm, and the bracket is provided with a limit post, which is arranged on a path where the protruding end rotates away from the follow-up arm; and wherein, when the protruding end abuts against the limit post, the limit post prevents the toggle block from rotating, and the protruding end keeps abutting against the follow-up arm.

14. The license plate carrier convenient to be installed on an automobile according to claim 12, wherein the movable arm is provided with a spring seat and an elastic member; one end of the elastic member is connected to the spring seat and the other end is connected to the bracket to drive the movable arm to rotate and close the included angle with the fixed arm.

15. The license plate carrier convenient to be installed on an automobile according to claim 10, wherein the locking mechanism comprises a locking hole arranged on the toggle block, a positioning hole arranged on at least one side plate of the at least two side plates and a latch, wherein the positioning hole is arranged corresponding to a moving track of the locking hole along with the rotation of the toggle lever, and the latch passes through the locking hole and the positioning hole to limit the rotation of the toggle block to maintain the opened included angle between the movable arm and the fixed arm.

16. The license plate carrier convenient to be installed on an automobile according to claim 15, wherein a plurality of positioning holes are arranged corresponding to the moving track of the locking hole along with the rotation of the toggle lever.

* * * * *